United States Patent
Ding et al.

(10) Patent No.: US 9,705,701 B2
(45) Date of Patent: Jul. 11, 2017

(54) METHOD FOR PROTECTING AN ETHERNET RING FROM A SUPERLOOP GOING THROUGH THE ETHERNET RING

(75) Inventors: Zhemin Ding, Stockholm (SE); Panagiotis Saltsidis, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 769 days.

(21) Appl. No.: 13/638,050

(22) PCT Filed: Mar. 30, 2010

(86) PCT No.: PCT/SE2010/050353
§ 371 (c)(1),
(2), (4) Date: Sep. 28, 2012

(87) PCT Pub. No.: WO2011/123002
PCT Pub. Date: Oct. 6, 2011

(65) Prior Publication Data
US 2013/0021901 A1   Jan. 24, 2013

(51) Int. Cl.
*H04L 12/46* (2006.01)
*H04L 12/40* (2006.01)
*H04L 12/437* (2006.01)

(52) U.S. Cl.
CPC ........ *H04L 12/4625* (2013.01); *H04L 12/437* (2013.01); *H04L 12/4015* (2013.01); *H04L 12/4637* (2013.01)

(58) Field of Classification Search
CPC .............. H04L 12/4625; H04L 12/437; H04L 12/4015; H04L 12/4637
See application file for complete search history.

(56) References Cited

U.S. PATENT DOCUMENTS

| | | |
|---|---|---|
| 2006/0215546 A1 | 9/2006 | Tochio |
| 2009/0316571 A1 | 12/2009 | Rose |
| 2010/0135154 A1* | 6/2010 | Cheung ............... H04L 12/4625 370/223 |
| 2010/0284413 A1* | 11/2010 | Abdullah et al. ............. 370/401 |
| 2010/0287405 A1* | 11/2010 | Soon ............................... 714/4 |

FOREIGN PATENT DOCUMENTS

| | | |
|---|---|---|
| WO | 03077459 A2 | 9/2003 |
| WO | 2009126390 A1 | 10/2009 |

OTHER PUBLICATIONS

Shah, S., et al., "Extreme Networks' Ethernet Automatic Protection Switching (EAPS), Version 1", IETF Standard-Working-Draft, RFC 3619, Feb. 4, 2003, 7 pages.
ITU-T, Telecommunication Standardization Sector of ITU, "Ethernet ring protection switching", Mar. 2010, 27 pages.

* cited by examiner

*Primary Examiner* — Walter Divito
(74) *Attorney, Agent, or Firm* — Rothwell, Figg, Ernst & Manbeck, P.C.

(57) ABSTRACT

The present invention relates to a method in an Ethernet ring for protecting the Ethernet ring from a superloop going through the Ethernet ring, wherein the Ethernet ring comprises at least one ring node and two interface nodes between the Ethernet ring and a VPLS-domain, the Ethernet ring further comprises a ring protection link, the method comprises the steps of: receiving in one of the interface nodes a withdrawal message intended to indicate that the other interface node is malfunctioning, the method being further characterized by the further step of; maintaining said ring protection link in the Ethernet ring in response to the withdrawal message.

15 Claims, 9 Drawing Sheets

METHOD FOR PROTECTING AN ETHERNET RING FROM A SUPERLOOP GOING THROUGH THE ETHERNET RING

CROSS-REFERENCE TO RELATED APPLICATION

This application is a 35 U.S.C. §371 National Phase Entry Application from PCT/SE2010/050353, filed Mar. 30, 2010, and designating the United States.

TECHNICAL FIELD

The present invention relates to a method in an Ethernet ring, an Ethernet ring and an interface node in a broadband communication network, and in particular to a method in an Ethernet ring, an Ethernet ring and an interface node for protecting against superloops going through the Ethernet ring.

BACKGROUND

An Ethernet ring 15 is a collection of ring nodes forming a closed loop whereby each ring node is connected to two adjacent ring nodes via duplex communication links 16. FIG. 1 illustrates an Ethernet ring 15 comprising 6 ring nodes connected to adjacent ring nodes via duplex communication links 16.

A loop of data in the Ethernet ring 15 consumes a lot of resources in the Ethernet ring 15 and is therefore an undesired condition. There is therefore a need for protection against loops in the Ethernet ring 15. The topology of an Ethernet Ring Protection, ERP, network can be a single Ethernet ring or a collection of interconnected Ethernet rings.

The G.8032 protocol is designed for Ethernet ring topologies and is developed as a standardized alternative to replace the spanning tree protocol, xSTP. It assumes standard 802.1 Q bridges are used and standard 802.3 MAC frames go around the Ethernet ring. G.8032 Ethernet ring nodes support standard FDB MAC learning, forwarding, flush behavior and port blocking/unblocking mechanisms.

The principle of loop prevention within the Ethernet ring 15 is to block one of the ring links 16, either a predetermined link or a failed link. For example, in a normal state, where there is no link failure as in FIG. 1, one of the ring links 16 is designated as a Ring Protection Link, RPL, 90. The RPL 90 blocks Ethernet traffic to avoid traffic looping. An RPL blocking is provided by port blocking at both end of the RPL 90. One of the nodes is called RPL Owner Node, e.g. ring node E 95, which is also responsible for activating reversion behavior from protected or Manual Switching or Forced Switching conditions. The other node is called RPL Node, e.g. ring node D 97, which is not responsible for activating reversion behavior. In G.8032 version 1, one end of RPL is blocked for breaking the loop in the normal state. In the draft of G.8032 version 2, both ends of RPL are blocked in a normal state to avoid unnecessary flooding.

FIG. 2 illustrates an Ethernet Ring Protection, ERP, state. When a link failure occurs, for example, a link 200 between Node A 210 and Node B 220. Node A 210 and Node B 220 block ports 211, 212 for the failed link 200 and send a R-APS, Ring-APS, Signal Failure messages to indicate the link failure. The Signal Failure messages are circulated around the Ethernet ring through a Ring APS channel (not shown). When the RPL Owner Node E 230 and RPL Node D 240 receive this message, they unblock ports to RPL.

When a link failure is restored, for example, if the link failure between Node A 210 and Node B 220 in FIG. 2 disappears, then Node A 210 and Node B 220 keep port 211 and port 212 blocked and send out R-APS No Failure message. The messages are circulated around the ring through Ring APS channel. When the RPL Owner Node E 230 and RPL Node D 240 receive this message, they block the ports to RPL and send out R-APS Blocking messages. Node A 210 and Node B 220 unblock the port 211 and 212 when they receive the R-APS Blocking messages from Node E 230 and Node D 240. Now the ERP ring is back to the Normal State.

FIG. 3 illustrates an example of a multi-ring/ladder network 300 comprising two Ethernet rings 310, 320. The G.8032 standard also supports the multi-ring/ladder network 300 illustrated in FIG. 3.

If the multi-ring/ladder network 300 is in its normal condition, RPL Owner Node and RPL node of each ring block the transmission and reception of traffic over the RPL for that ring. In this example, RPL Owner Node for ERP 1 is H 330 and for ERP 2 is E 340.

FIG. 4 illustrates a multi-ring/ladder network 400 in which a superloop 410 can be created. A superloop 410 is formed when a shared link failure occurs. For example in FIG. 4, if a link 425 between Node A 420 and Node B 430 fails, as this link 425 belongs to both ring 1 440 and ring 2 450, both rings 440, 450 initiate protection and unblock ports to RPL. A superloop 410 is formed. We therefore need a special protection mechanism for multi-ring/ladder network 400 to avoid the superloop problem.

FIG. 5 illustrates a Multi-ring/ladder network 500 with protection against a superloop. The superloop problem is solved by creating sub-rings. For example in Figure, ERP 1 510 is composed of nodes A, B, I, H and G and all links therein between. ERP 2 520 is composed of nodes A, B, C, D, E and F and all links except a link 530 between A and B. The link 530 between A and B only belongs to ERP 1 510. If the link 530 between A and B fails, only ERP1 510 will respond and ERP 2 520 will do nothing. ERP 2 520 is a sub-ring as defined in G.8032, which transmits R-APS message on the R-APS virtual channel.

A metro network is a network that covers a metropolitan area. The metro network is often based on the Ethernet standard. The metro network is commonly used as a metropolitan access network to connect subscribers and businesses to a larger service network or the Internet. In the metro network deployment, there may be a requirement to use G.8032 in an aggregation network and Virtual private LAN service, VPLS, in a core network.

FIG. 6 illustrates interworking between Provider edge, PE, routers 601, 602 and an Ethernet ring 603 running G.8032. The motivation of integrating Provider Edge routers 601, 602 into Ethernet ring 603 is to provide interface protection.

For PE1 601 and PE2 602 shown in FIG. 6, an interface (not shown) facing the Ethernet ring may be G.8032 ring ports. There is a dedicated tunnel (not shown) between PE1 601 and PE2 602. The G.8032 ring control messages received on the ring ports of PE1 601 or PE2 602 are transmitted transparently through the tunnel back to the Ethernet ring 603. No local ring control messages are leaked to a core network 613. No link level CCMs are sent through the tunnel between PE1 and PE2.

There are at least 3 interface failure scenarios:
1. Link Failure Between G.8032 Ring Bridge and One of the PEs 601, 602

For example, a link 604 between the Ring Bridge 605 and PE2 602 fails as shown FIG. 7. In this scenario, PE2 602 does nothing. The adjacent ring bridge 605 initiates Ethernet ring protection after detecting the link failure by unblocking RPL 606.

2. Tunnel Failure Between PE Nodes

For example, a tunnel 607 between PE1 601 and PE2 602 fails as in FIG. 8. PE1 601 and PE2 602 know it is a tunnel failure when they do not receive IGP withdrawal of partner edge router PE1 601, PE2 602 after certain amount of time. Any PE node 601, 602, 608, 609 will send a withdrawal message to other PE nodes 601, 602, 608, 609 if it finds out another PE node 601, 602, 608, 609 does not exist. After this period, PE1 601 and PE2 602 stop sending CCM from their ring interface towards ring bridges. The adjacent ring bridges 610, 611 detect there is a failure and initiate ring protection by unblocking RPL 612.

3. PE Node Failure

For example, the node of PE2 602 fails as in FIG. 9. The adjacent ring bridge 611 initiates ring protection after detecting the failure, e.g. no CCMs. PE1 601 know it is a node failure when it receives IGP withdrawal message of PE2 602 from PE4 609. PE1 601 then also sends out SF, signal failure, message to adjacent ring bridge 610 to inform of this failure. When ring bridges receive these messages, the RPL 612 will be unblocked to provide protection.

FIG. 10 illustrates a case where the core network 110 is segmented. In FIG. 10 the core network 110 is segmented into two portions 110a and 110b. In a case where the core network 110 is segmented a superloop 116 can be created if the existing mechanisms for protection against loops are used. In FIG. 10 the core network 110 is segmented into two parts 110a, 110b and there is therefore no communication between PE1 601, PE2 602 and PE3 608, PE4 609, respectively.

Since the core network is segmented into two parts 110a, 110b, PE1 601 is only connected to PE3 608 and PE2 602 is only connected to PE4 609. There is no communication between PE1 601, PE3 608 and PE2 602, PE4 609. PE1 601 will send out withdrawal messages about PE2 602 and PE4 609. PE2 602 will send out withdrawal messages about PE1 601 and PE3 608. PE3 608 will send out withdrawal messages about PE2 602 and PE4 609. PE4 609 will send out withdrawal messages about PE1 601 and PE3 608. After receiving those withdrawal messages, PE1 601 will assume PE2 602 has a node failure, at the same time, PE2 602 will assume PE1 601 has a node failure. Both PE1 601 and PE2 602 will send out SF message to adjacent ring bridges 125 to initiate the ring protection by unblocking RPL 160. PE3 608 and PE4 609 will behave the same way to unblock RPL 127 to provide protection. The result will be a superloop 116 as shown in FIG. 10.

There is therefore a need for an improved solution for increasing the robustness of Ethernet rings by preventing that superloops can be created, which solution solves or at least mitigates at least one of the above mentioned problems.

SUMMARY

An object of the present invention is thus to provide methods and arrangements for increasing the robustness of Ethernet rings by preventing a superloop from being created.

According to a first aspect, the present invention relates to a method in an Ethernet ring for protecting the Ethernet ring from a superloop going through the Ethernet ring. The Ethernet ring comprises at least one ring node and two interface nodes between the Ethernet ring and a VPLS-domain, the Ethernet ring further comprises a ring protection link. The method comprises the steps of: receiving in one of the interface nodes a withdrawal message intended to indicate that the other interface node is malfunctioning; maintaining the ring protection link in the Ethernet ring in response to the withdrawal message.

Thus, the object is achieved according to the present invention by maintaining the ring protection link in the Ethernet ring in response to a message intended to indicate that the other interface node is malfunctioning.

According to a second aspect, the present invention relates to an Ethernet ring for protecting the Ethernet ring from a superloop going through the Ethernet ring, wherein the Ethernet ring comprises at least one ring node, two interface nodes between the Ethernet ring and a VPLS-domain, and a ring protection link. The Ethernet ring further comprises receiving means in the interface node for receiving a withdrawal message intended to indicate that the other interface node is malfunctioning. The Ethernet ring being further configured to maintain the ring protection link in the Ethernet ring in response to the withdrawal message.

According to a third aspect, the present invention relates to an interface node for protecting an Ethernet ring from a superloop going through the Ethernet ring. The Ethernet ring comprises at least one ring node and two interface nodes between the Ethernet ring and a VPLS-domain. The Ethernet ring further comprises a ring protection link. The interface node also comprises: receiving means for receiving a withdrawal message intended to indicate that the other interface node is malfunctioning and processing means configured to decide not to transmit a signal failure message intended to unblock the protection link in response to the withdrawal message.

An advantage with embodiments of the present invention, where the ring protection link in the Ethernet ring is maintained, in response to the withdrawal message, is that a superloop can not be created via the Ethernet ring.

Yet another advantage with embodiments of the present invention is that less network resources are consumed since a superloop is prevented from being created. Yet another advantage of embodiments of the present invention is that a failure rate of the network also is reduced, since no superloop can be created.

BRIEF DESCRIPTION OF THE DRAWINGS

The invention is described in more detail with reference to enclosed drawings, wherein.

DETAILED DESCRIPTION

In the following description, for purposes of explanation and not limitation, specific details are set forth, such as particular sequences of steps, signalling protocols and device configurations in order to provide a thorough understanding of the present invention. It will be apparent to one skilled in the art that the present invention may be carried out in other embodiments that depart from these specific details.

Moreover, those skilled in the art will appreciate that functions and means explained herein below may be implemented using software functioning in conjunction with a programmed microprocessor or general purpose computer, and/or using an application specific integrated circuit (ASIC). It will also be appreciated that while the current invention is primarily described in the form of methods and arrangements, the invention may also be embodied in a computer program product as well as a system comprising a computer processor and a memory coupled to the processor, wherein the memory is encoded with one or more programs that may perform the functions disclosed herein.

Figure 1:
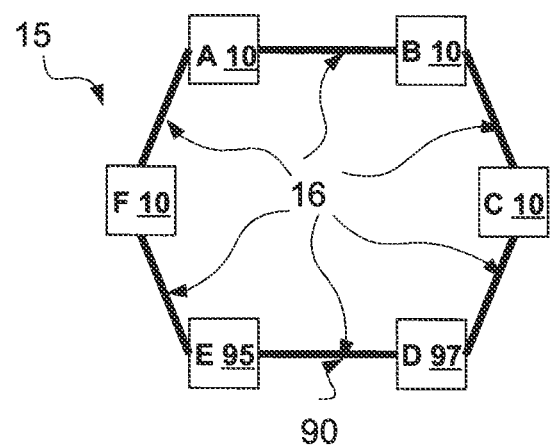
FIG. 1 illustrates schematically an Ethernet ring.
Figure 2:
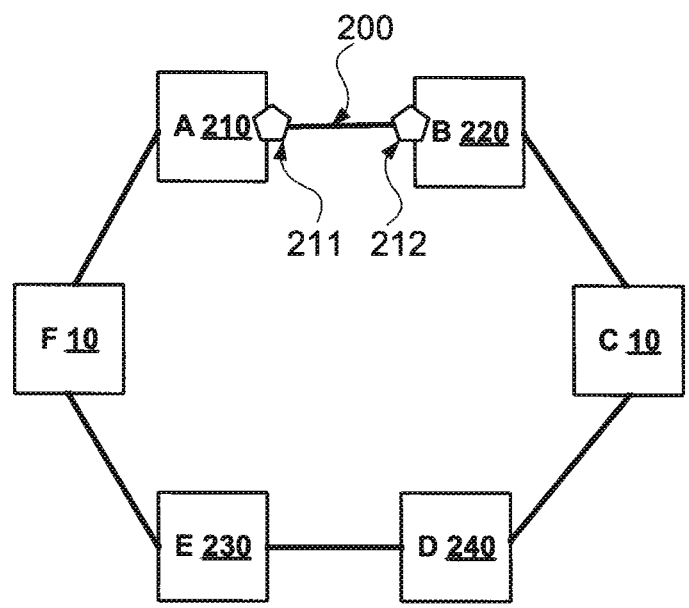
FIG. 2 illustrates schematically an Ethernet Ring Protection, ERP, state in an Ethernet ring.
Figure 3:
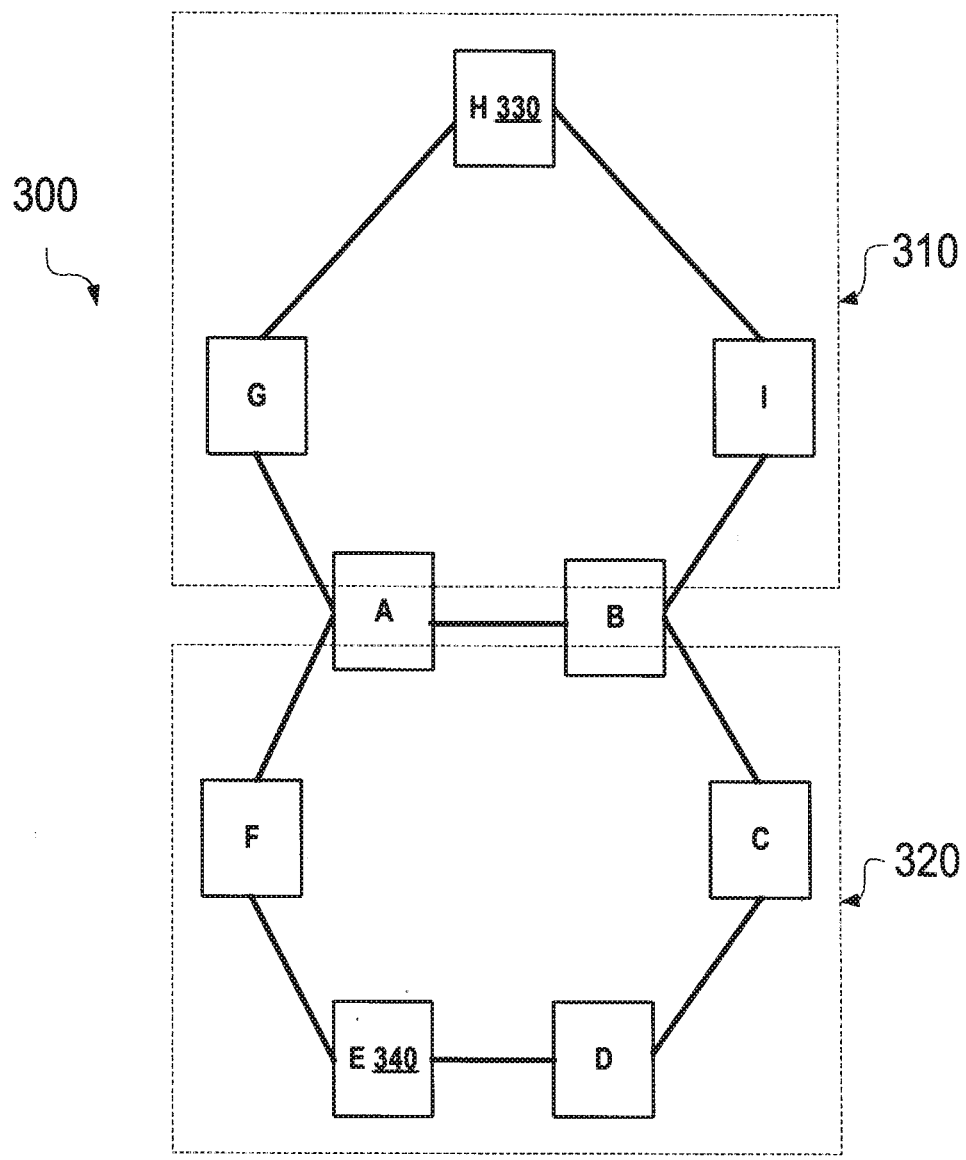
FIG. 3 illustrates schematically a multi-ring/ladder network comprising two Ethernet rings.
Figure 4:
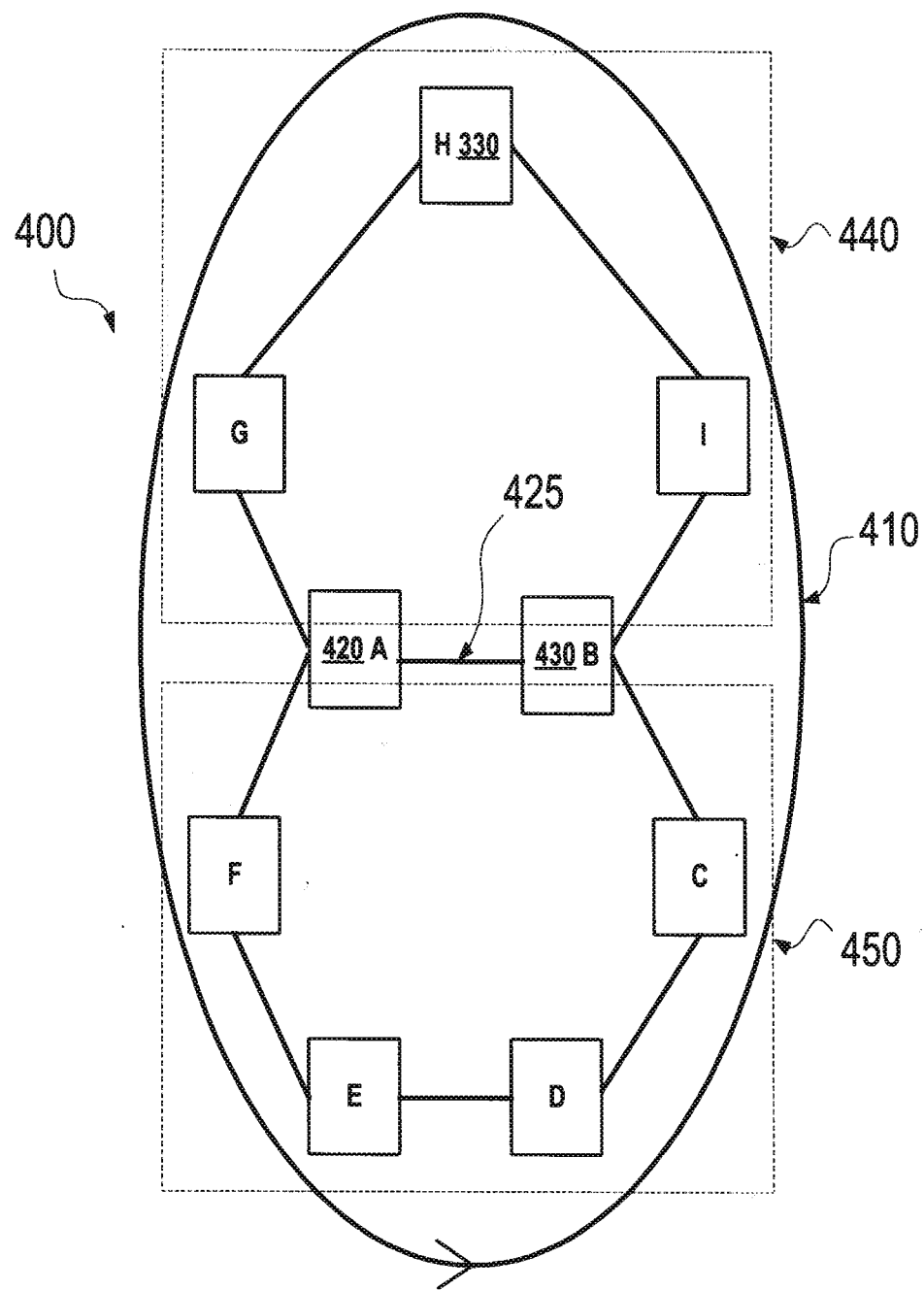
FIG. 4 illustrates schematically a multi-ring/ladder network in which a superloop can be created.
Figure 5:
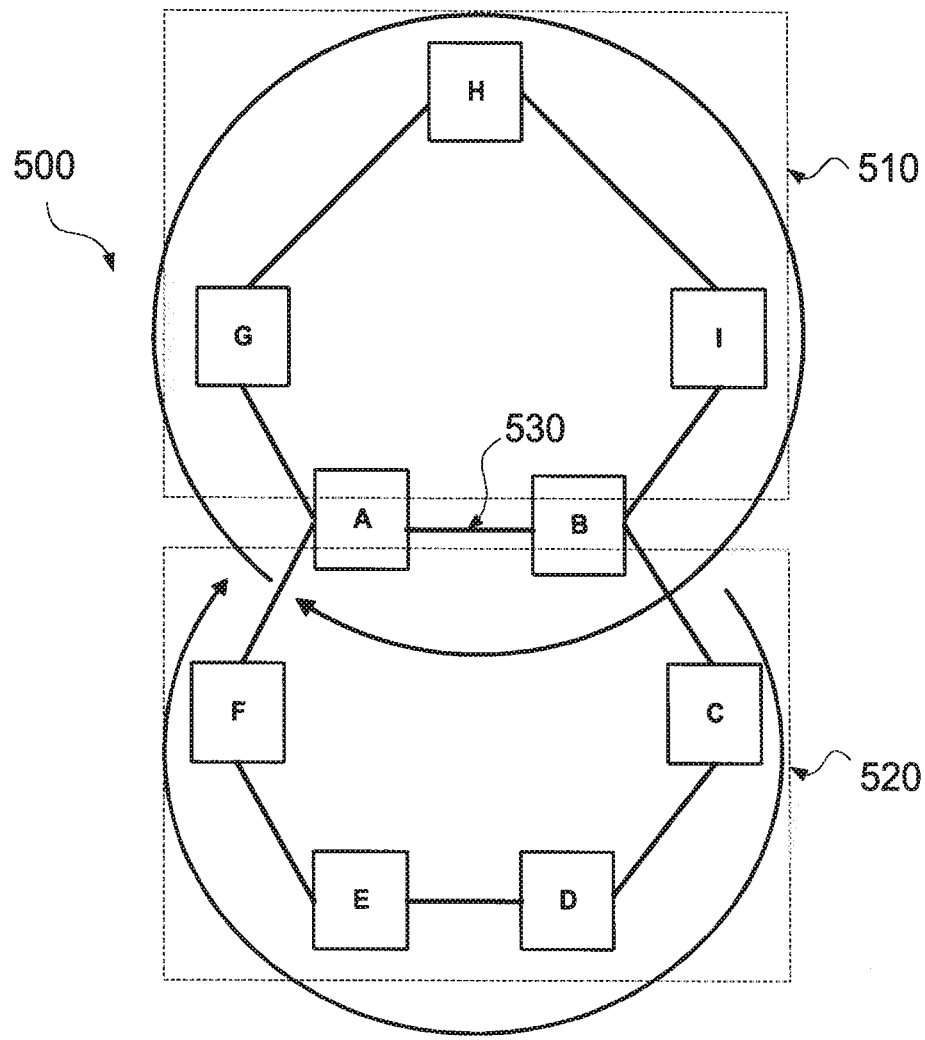
FIG. 5 illustrates schematically a Multi-ring/ladder network with protection against a superloop.
Figure 6:
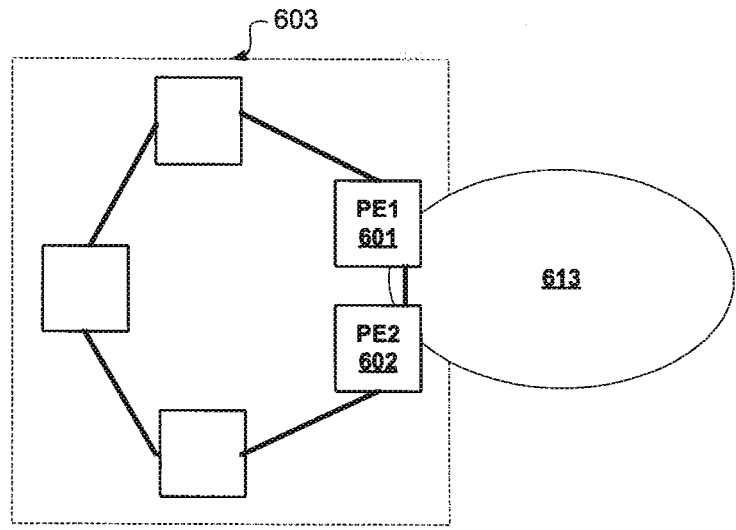
FIG. 6 illustrates schematically interworking between Provider edge, PE, routers 601, 602 and an Ethernet ring.
Figure 7:
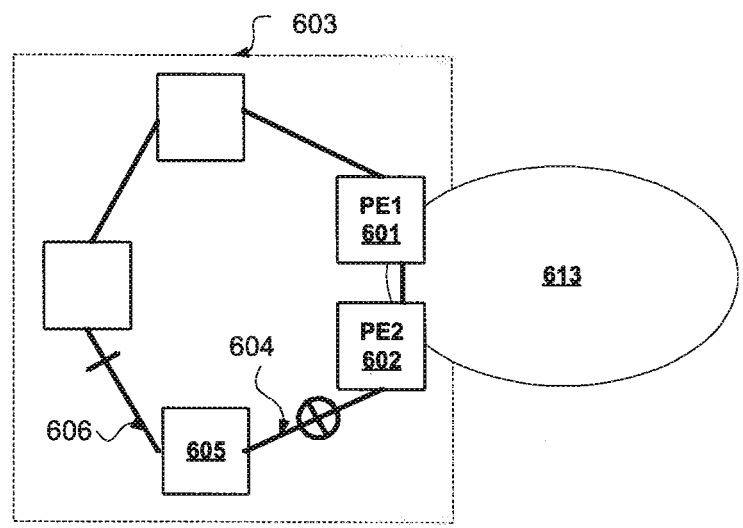
FIG. 7 illustrates schematically a link failure between a ring bridge and one PE node.
Figure 8:
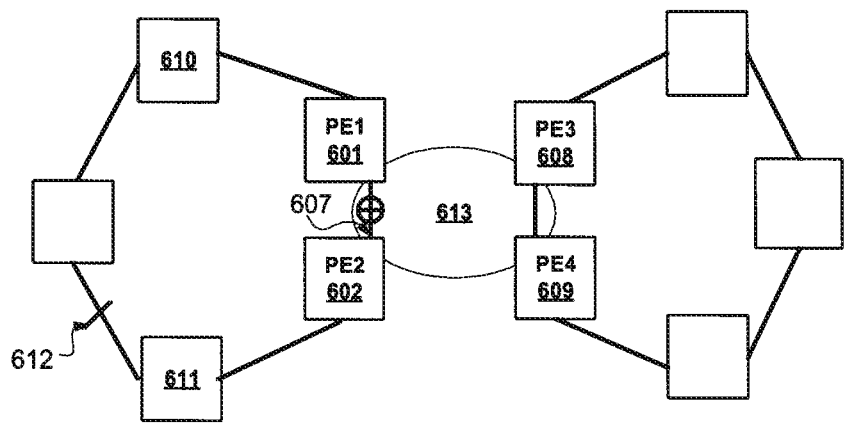
FIG. 8 illustrates schematically a tunnel failure between the PE nodes in the Ethernet ring.
Figure 9:
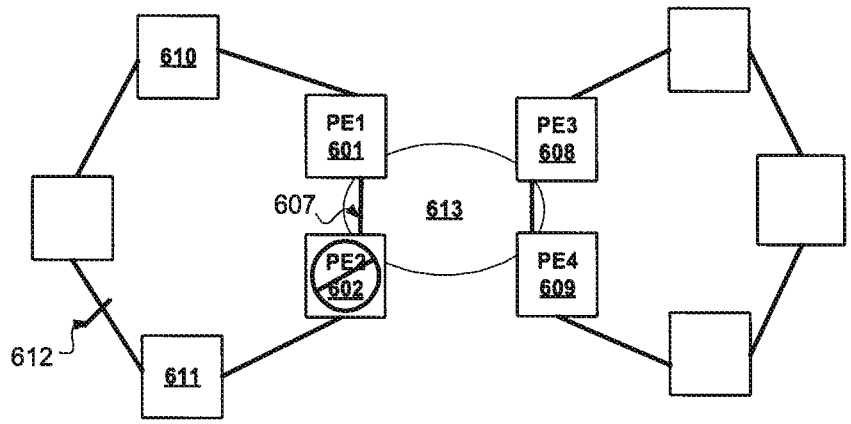
FIG. 9 illustrates schematically a PE node failure in the Ethernet ring.
Figure 10:
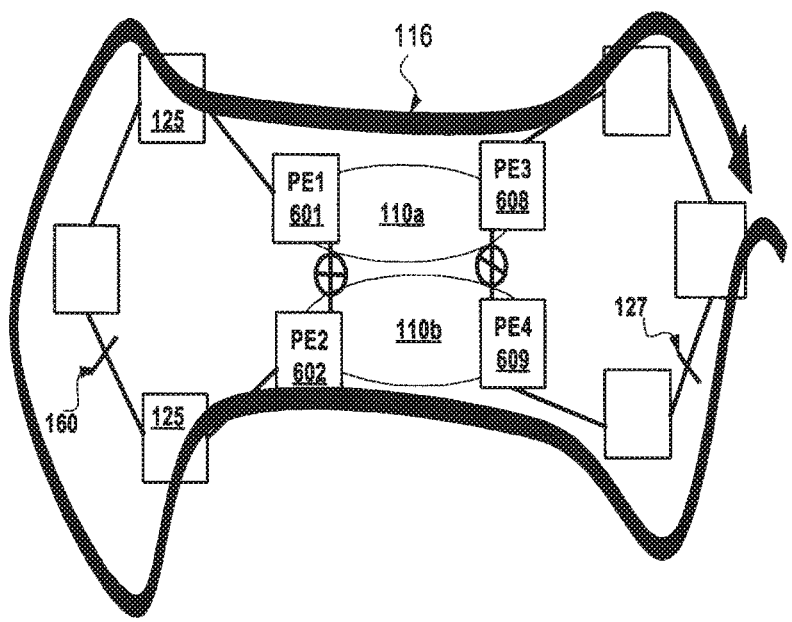
FIG. 10 illustrates a case where a core network is segmented into two portions 110 a and 110 b.
Figure 11:
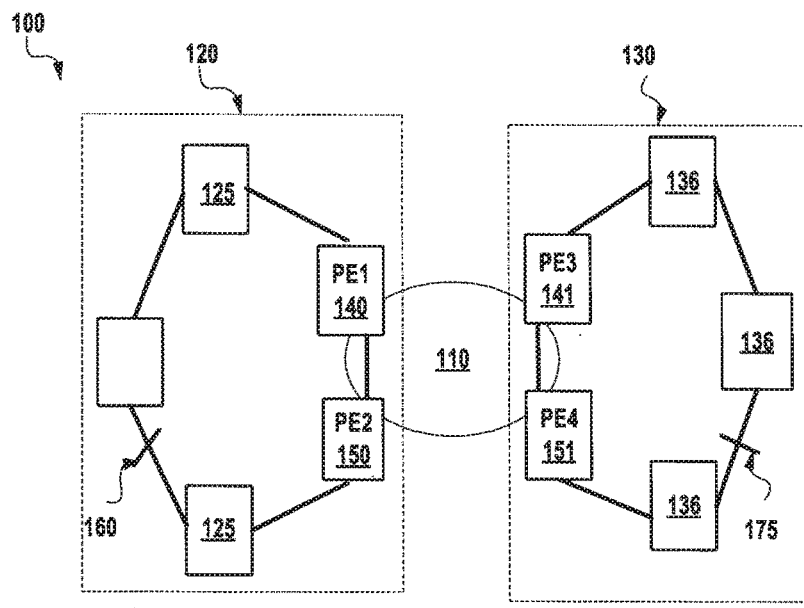
FIG. 11 shows a network in which a method according to the present invention can be implemented.

Turning now to FIG. 11, which shows a network 100 in which a method according to the present invention can be implemented. The network 100 comprises a core network 110 and at least one Ethernet ring 120, 130. The Ethernet ring 120 comprises at least one ring node 125 and two interface nodes PE1 140, PE2 150 between the Ethernet ring 120 and the core network 110. The Ethernet ring 130 also comprises at least one ring node 136 and two interface nodes PE 3 141, PE 4 151 between the Ethernet ring 130 and the core network 110. The core network 110 may be a VPLS-domain. The Ethernet ring 120 comprises a ring protection link 160 for protecting the Ethernet ring 120 from loops. The Ethernet ring 130 also comprises a ring protection link 175 for protecting the Ethernet ring 130 from loops.

Figure 12:
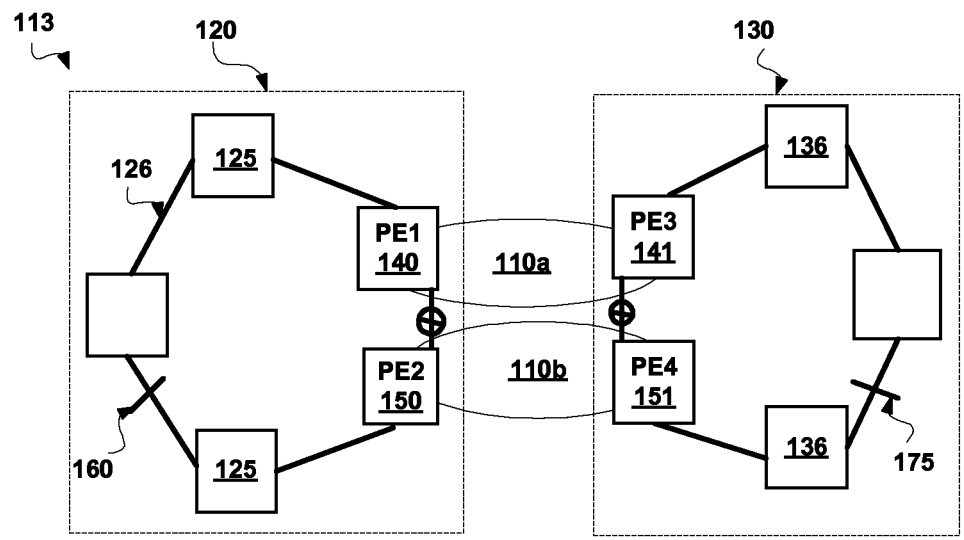
FIG. 12 illustrates a certain situations where the core network is segmented into two parts 110 a and 110 b.

Now referring to FIG. 12 which illustrates a certain situations where the core network 110 is segmented. The core network 110 can for instance be segmented into two parts 110 a and 110 b as illustrated in FIG. 12. When the core network 110 is segmented into two parts 110 a and 110 b there are no communication between PE1 140, PE2 150 and PE3 141, PE4 151, respectively. Since the core network is segmented PE 4 151 does not have any communication path to PE1 140. PE 4 151 will therefore send out a withdrawal message (not shown) indicating that PE 4 151 can not reach PE 1 140. This withdrawal message will be received by PE2 150. PE2 150 will then assume that PE 1 140 has a node failure. The same will apply for PE2 150, PE3 141 and PE4 151, they will all assume their respective partner PE-node has a node failure. This since they will receive a withdrawal message concerning their respective partner PE node. When the respective PE-node 140, 150, 141 and 151 receive a withdrawal message about their respective partner PE-node, the respective Ethernet ring 120, 130 will maintain the ring protection links 160, 175 in response to the withdrawal messages, in accordance with the present invention. This will result in that a superloop (not shown) can not be created in a network 113.

In another exemplary embodiment of the present invention, after the respective PE-nodes 140, 150, 141 and 151 have received withdrawal messages intended to indicate that their respective partner PE-node is malfunctioning. The respective PE-nodes 140, 150, 141 and 151 will decide not transmit a signal failure message on their respective Ethernet ring 120, 130, intended to unblock the respective protection links 160, 175. This will result in that both protection links 160, 175 will stay blocked, which results in that a superloop (not shown) can not be created in the network 113.

In yet another exemplary embodiment of method according to the present invention the ring nodes 125, 136 adjacent to the, respective, partner PE-nodes detects if the respective partner PE-nodes is malfunctioning. If the respective partner PE-nodes is malfunctioning they transmit a signal failure message to the respective Ethernet ring 120, 130.

In a yet further embodiment of the method according to the present invention the method comprises the further step of unblocking the ring protection links 160, 175 when receiving the signal failure message in the ring nodes 125,136 adjacent to the ring protection links 160, 175.

The ring nodes in the Ethernet rings 120, 130 may according to the present invention be connected to each other with duplex communication links. The duplex communication links may be standard 802.1 bridges.

The signal failure message in the present invention may be a signal failure message according to a G.8032 protocol standard.

In another exemplary embodiment of the present invention is the segmentation of the core network 110a, 110b addressed by assigning unique VLAN or VLAN group (not shown) to each Ethernet ring 120, 130, so that the blocking of one Ethernet ring 120, 130 does not affect traffic from other rings. As the number of VLANs in Provider Backbone network (not shown) is limited, PBB, provider Backbone Bridge, may be used if the number of VLAN is not sufficient.

Figure 13:
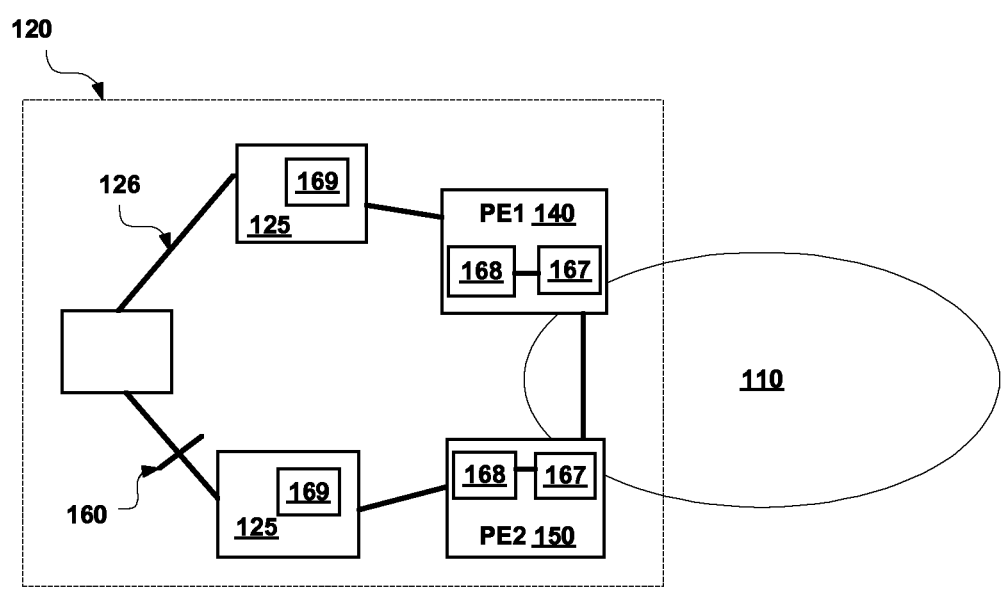
FIG. 13 illustrates a block diagram of an Ethernet ring according to an exemplary embodiment of the present invention.

Referring to FIG. 13, there is illustrated a block diagram of an Ethernet ring 120 in accordance with previously described exemplary embodiments of the present invention. The Ethernet ring 120 comprises at least one ring node 125 and two interface nodes 140, 150 between the Ethernet ring 120 and the core network 110. The Ethernet ring 120 also comprises a ring protection link 160 for protecting the Ethernet ring 120 from loops. Each interface nodes 140, 150 comprise receiving means 167 for receiving a withdrawal message intended to indicate that the other interface node 140, 150 is malfunctioning. The Ethernet ring 120 being further configured to maintain the ring protection link 160 in the Ethernet ring 120 in response to the withdrawal message.

In another exemplary embodiment of the Ethernet ring 120 according to the present invention, the interface nodes 140, 150 further comprises processing means 168 configured to decide not to transmit a signal failure message to the Ethernet ring 120, intended to unblock the ring protection link 160, in response to the withdrawal message. This will result in the protection links 160, will stay blocked, which results in that a superloop (not shown) can not go through the Ethernet ring 120.

In yet another exemplary embodiment of the Ethernet ring 120 according to the present invention a ring node 125 adjacent to the partner interface node 140, 150 comprises means 169 for detecting if the partner interface node 140, 150 is malfunctioning. If the partner interface node 140, 150 is malfunctioning the means 169 in the ring node 125 transmits a signal failure message to the Ethernet ring 120.

In a yet further embodiment of the Ethernet ring 120 according to the present invention the ring node 125 adjacent to the ring protection link 160 is further configured to unblocking the ring protection link 160 when receiving the signal failure message.

It should be noted that the Ethernet ring 120 depicted in FIG. 13 may comprise other elements or means not illustrated. Furthermore, the different blocks the Ethernet ring 120 are not necessarily separated but could be included in a single block.

Figure 14:
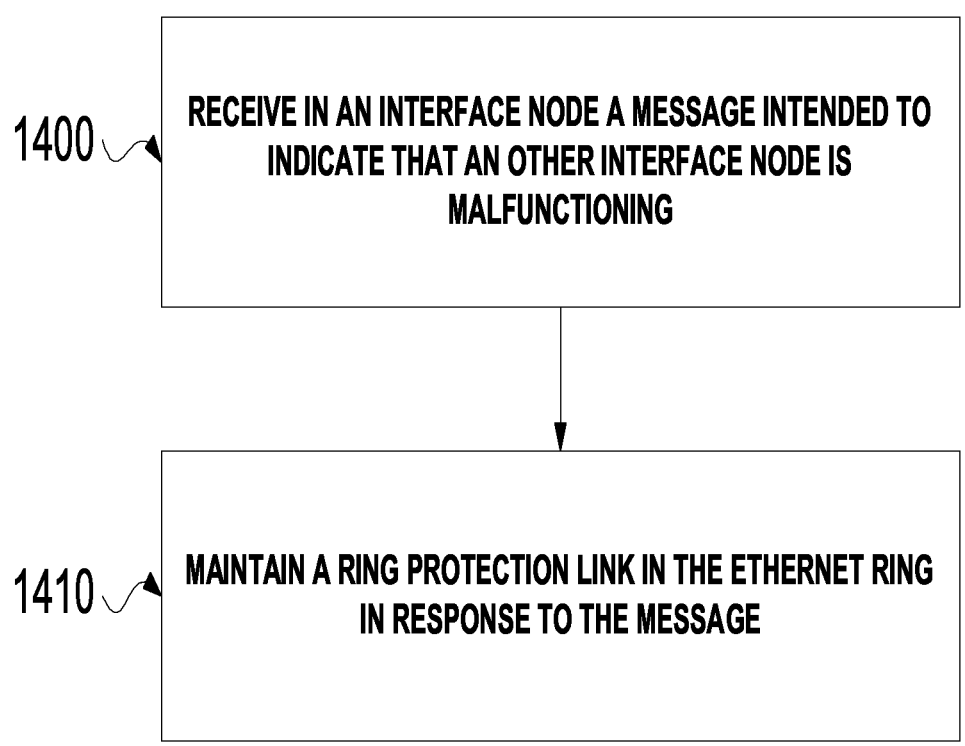
FIG. 14 illustrates a method according to an exemplary embodiment of the present invention.

Referring to FIG. 14 there is illustrated a flowchart of a method describing the steps for protecting the Ethernet ring 120 from a superloop going through the Ethernet ring 120, in accordance with previously described embodiments of the present invention. As shown in FIG. 14, the method comprises:

1400 receiving in one of the interface nodes 140, 150 a withdrawal message intended to indicate that the other interface node 140, 150 is malfunctioning;

1410 maintaining the ring protection link 160 in the Ethernet ring 120 in response to the withdrawal message.

As previously described, the method may comprise a further step of detecting (not shown) in the ring node 125 adjacent to the other interface node 140, 150 if the other interface node 140, 150 is malfunctioning, and transmitting a signal failure message to the Ethernet ring 120 in a case where the other interface node 140, 150 is malfunctioning.

The method may also comprise the further step of unblocking (not shown) the ring protection link 160 when receiving a signal failure message in the ring node 125 adjacent to the ring protection link 160.

In the above described exemplary embodiments of the present invention the core network was segmented into two parts. Note that it is however possible that a superloop is created when the core network is segmented into more than two parts.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method for preventing the formation of a superloop in a network comprising a first Ethernet ring, wherein the first Ethernet ring comprises: a ring node, a first interface node, a second interface node, and a ring protection link, wherein the first interface node is operable to communicate with a third interface node of a second Ethernet ring via a first segment of a core network and the second interface node is operable to communicate with a fourth interface node of the second Ethernet ring via a second segment of the core network, the method comprising:
the third interface node of the second Ethernet ring detecting that it cannot communicate with the second interface node of the first Ethernet ring;
as a result of the third interface node of the second Ethernet ring detecting that it cannot communicate with the second interface node of the first Ethernet ring, the third interface node of the second Ethernet ring transmitting to the first interface node of the first Ethernet ring a first failure message indicating a malfunction of the second interface node of the first Ethernet ring;
the first interface node receiving via the first segment of the core network the first failure message transmitted by the third interface node of the second Ethernet ring; and
the first interface node maintaining said ring protection link in the first Ethernet ring in response to the first failure message received from the third interface node of the second Ethernet ring, wherein said step of maintaining said ring protection link comprises the first interface node, in response to the first failure message, deciding not to transmit on the first Ethernet ring a signal failure message for causing the first Ethernet ring to unblock the ring protection link.

2. The method according to claim 1, further comprising:
the ring node of the first Ethernet ring detecting that the second interface node is malfunctioning; and
the ring node of the first Ethernet ring transmitting a second failure message to the first Ethernet ring in response to detecting that the second interface node is malfunctioning.

3. The method according to claim 2, further comprising unblocking said ring protection link in response to receiving the second failure message.

4. The method according to claim 1, wherein duplex communication links connect each ring node in the first Ethernet ring.

5. The method according to claim 4, wherein the duplex communication links are standard 802.1 bridges.

6. The method according to claim 1, wherein said second failure message is a signal failure message according to a G.8032 protocol standard.

7. A first Ethernet ring protected against a superloop going through the Ethernet ring, wherein the first Ethernet ring comprises:
a first ring node;
a first interface node;
a second interface node; and
a ring protection link, wherein
the first interface node is operable to communicate with a third interface node of a second Ethernet ring via a first segment of a core network,
the second interface node is operable to communicate with a fourth interface node of the second Ethernet ring via a second segment of the core network,
the first interface node comprises a receiver for receiving a first failure message indicating that the third interface node has detected that the second interface node is malfunctioning, and
the first interface node is configured to maintain said ring protection link in the first Ethernet ring in response to the first failure message by not transmitting on the first Ethernet ring a signal failure message for causing the first Ethernet ring to unblock the ring protection link.

8. The first Ethernet ring according to claim 7, wherein the first ring node is adjacent to the second interface node and comprises a detector configured to detect whether the second interface node is malfunctioning and is configured to transmit a signal failure message in response to detecting that the second interface node is malfunctioning.

9. The Ethernet ring according to claim 8, wherein the first Ethernet ring further includes a second ring node adjacent to the ring protection link, wherein the second ring node is operable to receive the signal failure message transmitted by the first ring node and is configured to unblock said ring protection link in response to receiving the signal failure message.

10. The Ethernet ring according to claim 7, wherein duplex communication links connect each ring node in the first Ethernet ring.

11. The Ethernet ring according to claim 10, wherein the duplex communication links are standard 802.1 bridges.

12. A first interface node for protecting a first Ethernet ring from a superloop going through the first Ethernet ring, wherein the first Ethernet ring comprises: a ring node, the first interface node, a second interface node, and a ring protection link, wherein the first interface node is operable to communicate with a third interface node of a second Ethernet ring via a first segment of a core network, and the second interface node is operable to communicate with a fourth interface node of the second Ethernet ring via a second segment of the core network, the first interface node comprising:

a receiver for receiving, via the first segment of the core network, a first failure message transmitted by the third interface node, said first failure message indicating that a third interface node has detected that the second interface node is malfunctioning; and a processor configured to maintain said ring protection link in the Ethernet ring in response to the first failure message by not transmitting on the first Ethernet ring a signal failure message for causing the first Ethernet ring to unblock the ring protection link.

13. The first interface node according to claim 12, wherein said signal failure message is a signal failure message according to a G.8032 protocol standard.

14. The first interface node according to claim 12, wherein a duplex communication link connects the first interface node to an adjacent ring node in the first Ethernet ring.

15. The first interface node according to claim 14, wherein the duplex communication link is a standard 802.1 bridge.

* * * * *